US007898112B2

(12) United States Patent
Powell et al.

(10) Patent No.: US 7,898,112 B2
(45) Date of Patent: Mar. 1, 2011

(54) APPARATUSES AND METHODS TO CONNECT POWER SOURCES TO AN ELECTRIC POWER SYSTEM

(75) Inventors: Earl G. Powell, Sunnyvale, CA (US); Ron Hadar, Cupertino, CA (US)

(73) Assignee: Tigo Energy, Inc., Los Gatos, CA (US)

( * ) Notice: Subject to any disclaimer, the term of this patent is extended or adjusted under 35 U.S.C. 154(b) by 291 days.

(21) Appl. No.: 12/260,720

(22) Filed: Oct. 29, 2008

(65) Prior Publication Data
US 2009/0146505 A1 Jun. 11, 2009

Related U.S. Application Data

(60) Provisional application No. 61/005,525, filed on Dec. 6, 2007.

(51) Int. Cl.
*H02J 1/00* (2006.01)
*H02J 3/00* (2006.01)
(52) U.S. Cl. .......................................... 307/85
(58) Field of Classification Search .............. 307/64, 307/80, 85, 87
See application file for complete search history.

(56) References Cited

U.S. PATENT DOCUMENTS

| 5,235,266 | A | 8/1993 | Schaffrin |
| 5,268,832 | A | 12/1993 | Kandatsu |
| 5,604,430 | A | 2/1997 | Decker et al. |
| 5,686,766 | A | 11/1997 | Tamechika |
| 5,923,158 | A | 7/1999 | Kurokami et al. |
| 6,275,016 | B1 | 8/2001 | Ivanov |
| 6,448,489 | B2 | 9/2002 | Kimura et al. |
| 6,465,910 | B2 * | 10/2002 | Young et al. .................... 307/64 |
| 6,650,031 | B1 | 11/2003 | Goldack |
| 6,844,739 | B2 | 1/2005 | Kasai et al. |
| 6,894,911 | B2 | 5/2005 | Telefus et al. |
| 6,897,784 | B2 * | 5/2005 | Goehlich ...................... 340/635 |
| 6,984,970 | B2 | 1/2006 | Capel |
| 7,061,214 | B2 | 6/2006 | Mayega |
| 7,248,946 | B2 | 7/2007 | Bashaw et al. |
| 7,256,566 | B2 | 8/2007 | Bhavaraju et al. |
| 7,276,886 | B2 | 10/2007 | Kinder |
| 7,518,346 | B2 | 4/2009 | Prexl |

(Continued)

FOREIGN PATENT DOCUMENTS
AU 2005262278 7/2005
(Continued)

OTHER PUBLICATIONS
International Patent Application No. PCT/US2008/083137, Written Opinion & International Search Report, Jun. 11, 2009.
(Continued)

*Primary Examiner* — Jared J Fureman
*Assistant Examiner* — Carlos Amaya
(74) *Attorney, Agent, or Firm* — Greenberg Traurig, LLP

(57) ABSTRACT

Apparatuses and methods to firewall distributed energy sources. In one aspect, an apparatus includes: a first connector configured to interface with a distributed energy source; a second connector configured to interface with a connection point of an electric power system; at least one switch coupled between the first connector and the second connector; at least one sensor coupled with the switch; and a controller coupled with the at least one switch, the controller to use the at least one switch to selectively connect or disconnect an electric path between the first connector and the second connector based on signals from the at least one sensor.

19 Claims, 3 Drawing Sheets

U.S. PATENT DOCUMENTS

| | | |
|---|---|---|
| 7,595,616 B2 | 9/2009 | Prexl |
| 7,605,498 B2 | 10/2009 | Ledenev et al. |
| 7,719,140 B2 | 5/2010 | Ledenev et al. |
| 2005/0057214 A1 | 3/2005 | Matan |
| 2005/0057215 A1 | 3/2005 | Matan |
| 2006/0001406 A1 | 1/2006 | Matan |
| 2006/0174939 A1 | 8/2006 | Matan |
| 2006/0185727 A1 | 8/2006 | Matan |
| 2007/0273351 A1 | 11/2007 | Matan |
| 2008/0121272 A1 | 5/2008 | Besser et al. |
| 2008/0122449 A1 | 5/2008 | Besser et al. |
| 2008/0122518 A1 | 5/2008 | Besser et al. |
| 2008/0179949 A1 | 7/2008 | Besser et al. |
| 2008/0191560 A1 | 8/2008 | Besser et al. |
| 2008/0191675 A1 | 8/2008 | Besser et al. |
| 2008/0303503 A1 | 12/2008 | Wolfs |

FOREIGN PATENT DOCUMENTS

| | | |
|---|---|---|
| DE | 4232356 | 3/1994 |
| DE | 19961705 | 7/2001 |
| EP | 1388774 | 2/2004 |
| ES | 2249147 | 3/2006 |
| JP | 2002171671 | 7/2002 |
| JP | 2005198446 | 6/2005 |
| KR | 200546890 | 5/2005 |
| WO | 03012569 | 2/2003 |

OTHER PUBLICATIONS

Palma, L. et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

Quaschning, V. et al., "Cost Effectiveness of Shadow Tolerant Photovoltaic Systems," Euronsun 96, pp. 819-824, Sep. 16, 1996.

Uriarte, S. et al., "Energy Integrated Management System for PV Applications," 20th European Photovoltaic Solar Energy Conference, Jun. 6, 2005.

Walker, G. R. et al., "Cascaded DC-DC Converter Connection of Photovoltaic Modules," 33rd IEEE Power Electronics Specialists Conference (PESC'02), vol. 1, pp. 24-29, 2002.

Alonso, R. et al., "A New Distributed Converter Interface for PV Panels," 20th European Photovoltaic Solar Energy Conference, Barcelona, Spain, pp. 2288-2291, Jun. 6-10, 2005.

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Enslin, Johan H.R., et al., "Integrated Photovoltaic Maximum Power Point Tracking Converter," IEEE Transactions on Industrial Electronices, vol. 44, No. 6, pp. 769-773, Dec. 1997.

Roman, Eduardo, et al., "Intelligent PV Module for Grid-Connectred PV Systems," IEEE Transactions on Industrial Electronics, vol. 53, No. 4, pp. 1066-1073, Aug. 2006.

Walker, Jeffrey R. et al., "Cascaded DC-DC Converter Connection of Photovoltaic Modules," IEEE Transactions on Power Electronics, vol. 19, No. 4, pp. 1130-1139, Jul. 2004.

Basso, Tim, "IEEE Standard for Interrconnecting Distributed Resources With the Electric Power System," IEEE PES Meeting, Jun. 9, 2004.

Boostbuck.com, "The Four Boostbuck Topologies," http://www.boostbuck.com/TheFourTopologies.html, 2003.

Gautam, Nalin K. et al., "An Efficient Algorithm to Simulate the Electrical Performance of Solar Photovoltaic Arrays," Energy, vol. 27, No. 4, pp. 347-361, 2002.

International Patent Application PCT/US08/75127, International Search Report and Written Opinion (mailed Apr. 28, 2009).

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

* cited by examiner

APPARATUSES AND METHODS TO CONNECT POWER SOURCES TO AN ELECTRIC POWER SYSTEM

RELATED APPLICATIONS

The present application claims priority to provisional U.S. Patent Application Ser. No. 61/005,525, filed on Dec. 6, 2007 and entitled "Methods and Apparatus for Supervisory Firewall for Distributed Electrical Generation System," the disclosure of which is hereby incorporated herein by reference.

FIELD OF THE TECHNOLOGY

At least some embodiments disclosed herein relate to connecting electric power generators to an electric power system in general and more particularly but not limited to, connecting distributed energy sources to an area electric power system.

BACKGROUND

Individuals and enterprises are currently employing distributed electrical generation systems with increasing frequency. A distributed electrical generation system may also be called a distributed energy resource, or distributed generator, or distributed resource.

A distributed electrical generation system may be an electric generation facility connected to an Area Electric Power System (Area EPS). A distributed electrical generation system may be a small-scale electric generator located next to and connected to the load being served either with or without an electric grid interconnection. A distributed electrical generation system may use an advanced turbine, a reciprocating engine, a fuel cell, a photovoltaic panel, a wind turbine, a micro-turbine, etc. to generate electricity.

A typical purpose of such a distributed electrical generation system is to reduce its owner's electricity bill, as well as, in some cases, to utilize electricity generated in a more environmentally friendly method than the power provided by the local electrical utility.

One of the factors contributing to the expense of such a system is associated with hooking up the distributed electrical generation system to the electricity grid, which has many requirements, such as those specified in the IEEE standard 1547 or other, similar standards in effect in Europe and other areas of the world for interconnecting distributed resources with electric power systems.

Although a distributed electrical generation system may be relatively easily designed to meet such requirements, it is rather expensive to pass the full testing suite required to obtain regulatory approval. As a result, novel designs may be delayed, or not implemented at all, because the volume of a small series does not justify the expense of undergoing the approval process, which, in some cases, may cost US$100,000 or more.

In other cases, distributed electrical generation systems may be connected to the grid without obtaining regulatory approval, sometimes with disastrous consequences.

More detailed information about distributed electrical generation systems can be found in Institute of Electrical and Electronics Engineers (IEEE) standard 1547, which is incorporated herein by reference.

SUMMARY OF THE DESCRIPTION

Apparatuses and methods to firewall distributed energy sources are described herein. Some embodiments are summarized in this section.

In one aspect, an apparatus includes: a first connector configured to interface with a distributed energy source; a second connector configured to interface with a connection point of an electric power system; at least one switch coupled between the first connector and the second connector; at least one sensor coupled with the switch; and a controller coupled with the at least one switch, the controller to use the at least one switch to selectively connect or disconnect an electric path between the first connector and the second connector based on signals from the at least one sensor.

In one embodiment, the distributed energy source includes an electric power generator based on at least one of: solar, wind, water, tide, wave, geothermal, gas, biofuel, pressured air and batteries.

In one embodiment, the controller and the at least one sensor are configured to use the at least one switch to disconnect the electric path between the first connector and the second connector when the distributed energy source is not in compliance with an standard for interconnecting distributed resources with electric power systems, such as the Institute of Electrical and Electronics Engineers (IEEE) standard 1547. In one embodiment, the controller is re-configurable to interface with a plurality of types of distributed energy sources for compliance with the IEEE standard 1547.

In one embodiment, the at least one sensor includes a voltage sensor and a current sensor, such as a current sensor to measure a current between the first connector and the second connector and a voltage sensor to monitor an output voltage of the distributed energy source at least when the at least one switch disconnects the second connector from the first connector.

In one embodiment, the at least one switch includes a semiconductor switch and a mechanical switch connected in serial between the first connector and the second connector. The mechanical switch may include a galvanic switch.

In one embodiment, the controller includes a microprocessor, a memory configured to store instructions for the microprocessor, and an input/output (I/O) controller to interface with the at least one sensor and the at least one switch. The apparatus may further include a user interface coupled with the microprocessor to configure operations of the microprocessor.

In one embodiment, the operations of the microprocessor are configurable for a plurality of different requirements associated with different types of distributed energy sources.

In another aspect, a method implemented in a controller includes: monitoring an output of a distributed energy source using the controller; determining whether the output of the distributed energy source is in a predetermined range; and controlling at least one switch to selectively couple or decouple the output of the distributed energy source to or from an electric power system based on whether the output of the distributed energy source is within a predetermined range.

In one embodiment, the predetermined range is based on a standard for interconnecting distributed resources with electric power systems; and the controller is reconfigurable to monitor a plurality of different types of distributed energy sources for compliance with the standard.

In one embodiment, the monitoring of the output includes monitoring a phase or frequency of the output of the distributed energy source; and the controlling of the switch includes closing the switch to connect the distributed energy source to a point of common coupling to an area electric power system when the output of the distributed energy source is within the predetermined range, and opening the switch to disconnect the distributed energy source from the point of common coupling to the area electric power system when the output of the distributed energy source is outside the predetermined range.

In one embodiment, the method further includes storing a set of rules and constraints in a memory of the controller to represent the predetermined range; and modifying the set of rules and constraints in the memory to adapt the controller for the distributed energy source.

In one embodiment, after opening the switch in response to the output of the distributed energy source being out side the predetermined range, the controller holds off a period of time according to the set of rules and constraints prior to resetting.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

One embodiment of the disclosure provides methods and apparatuses of supervisory firewall for distributed electrical generation systems. The firewall can be inserted between a distributed energy resource and the electrical power system in such a way that the power generation system as connected via the firewall is in full compliance with regulations and, at the same time, does not require the expensive testing of the actual distributed energy resource.

Figure 1:
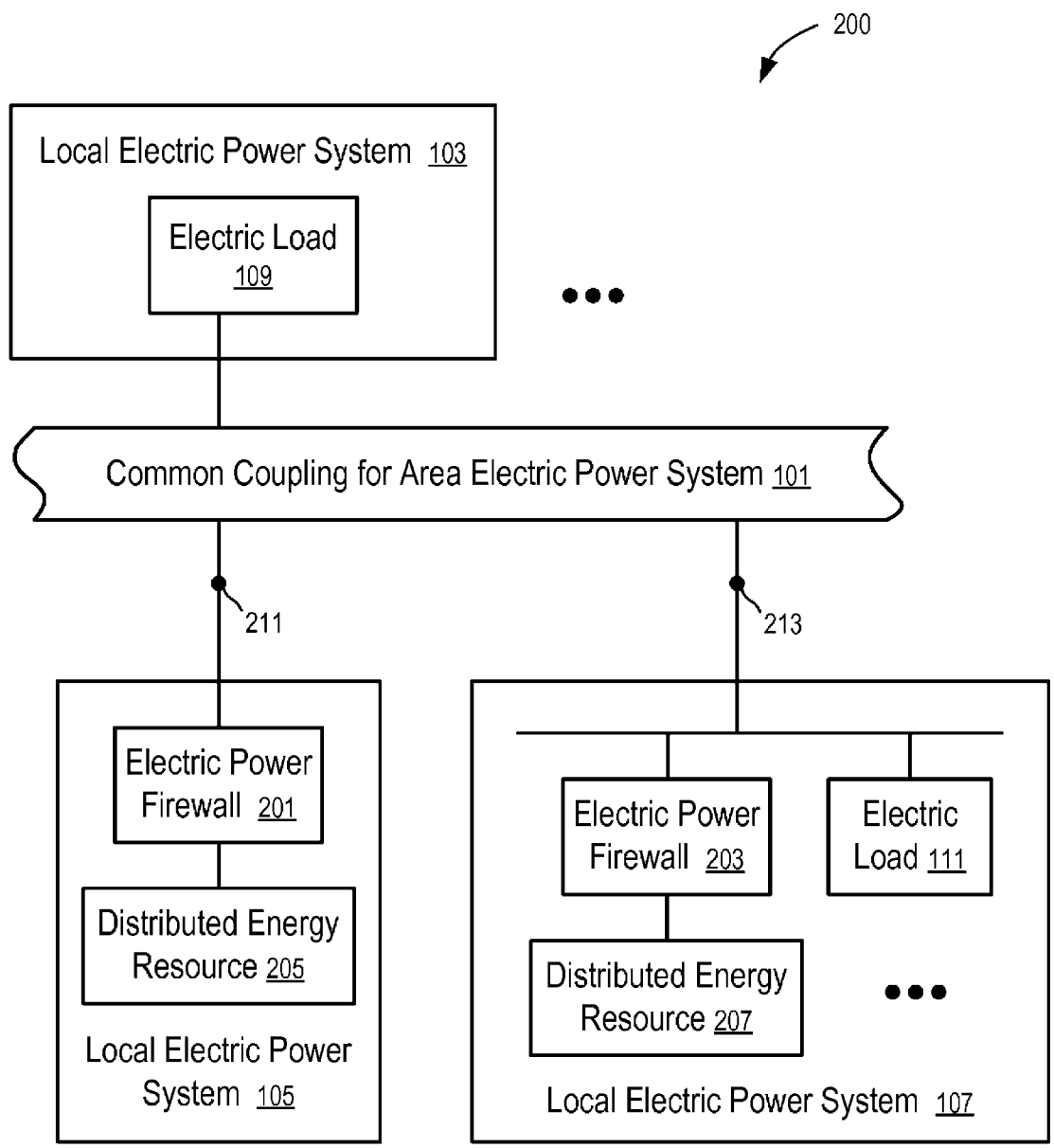
FIG. 1 illustrates ways to connect distributed energy sources via electric power firewalls according to some embodiments.

FIG. 1 illustrates ways to connect distributed energy sources via electric power firewalls according to some embodiments. The area electric power system 200 includes a number of local electric power systems (e.g., 103, 105, 107, etc.), each of which is connected to the common coupling 101 for the area electric power system. In one embodiment, the common coupling 101 is the transmission lines of the electricity grid.

In FIG. 1, some of the local electric power systems (e.g., 105 and 107) have distributed energy resources (e.g., 205 and 207); and some of the local electric power systems (e.g., 103 and 107) have electric loads (e.g., 109 and 111) that consume electricity.

In one embodiment, a distributed energy resource is a source of electric power that generally is not directly connected to a bulk power transmission system. A distributed energy resource may use generators and/or energy storage technologies, which may include, but are not limited to, technologies based on one or more of: solar, wind, water, tide, waves, geothermal, gas, biofuels, pressured air, batteries, etc.

In FIG. 1, a point of common coupling (PCC) (e.g., 211 or 213) connects a local electric power system (local EPS) with the area electric power system (area EPS); and a point of distributed resource connection (PDRC) connects a distributed energy resource to a local EPS.

In FIG. 1, an electric power firewall (e.g., 201 or 203) is placed at the point of resource connection (PDRC) for the corresponding distributed energy resource (e.g., 205 or 207) to ensure that as a whole the electric power firewall and the corresponding distributed energy resource are in compliance with standards.

In the example illustrated in FIG. 1, the distributed energy resource 205 may deliver electricity to the area EPS 200 through the electric power firewall 201 and the point of common coupling (PCC) 211; and the distributed energy resource 207 may deliver electricity to the local EPS 107 through the electric power firewall 203 and to the area EPS 200 through the electric power firewall 203 and the point of common coupling (PCC) 213. The local EPS may include an electric load 111.

An example of a local EPS may include a transformer and a few poles to support wires for connection to the point of common coupling (e.g., an electricity meter).

In FIG. 1, the distributed energy resources (e.g., 205 and 207) may or may not be in compliance with standards, such as IEEE standard 1547. The electric power firewalls (e.g., 201 and 203) are configured to monitor the outputs of the distributed energy resources (e.g., 205 and 207) and disconnect the corresponding distributed energy resources when their outputs are not in compliance with the standards. Thus, as a whole the electric power firewall (e.g., 201 or 203) and the corresponding distributed energy resource (e.g., 205 or 207) connected via the electric power firewall are in compliance with the standards.

The connection methods illustrated in FIG. 1 allow the use of the distributed energy resources in a way in compliance with the standards, such as IEEE standard 1547, without requiring the distributed energy resource (e.g., 205 or 207) to be tested for compliance with IEEE standard 1547. Such testing is very expensive and often, in the case of small producers, prohibitively expensive.

Thus, the presence of firewalls 201 and 203 relieves the distributed energy resources 205 and 207 from their testing requirements for IEEE standard 1547. Other than the codes concerning electrical safety, such as local, state, national and other applicable codes, the distributed energy resources 205 and 207 do not have to be tested for compliance with IEEE standard 1547, or other similar standards in effect in Europe and other areas of the world for interconnecting distributed resources with electric power systems, since the compliance/conformance is met by the firewalls 201 and 203.

Figure 2:
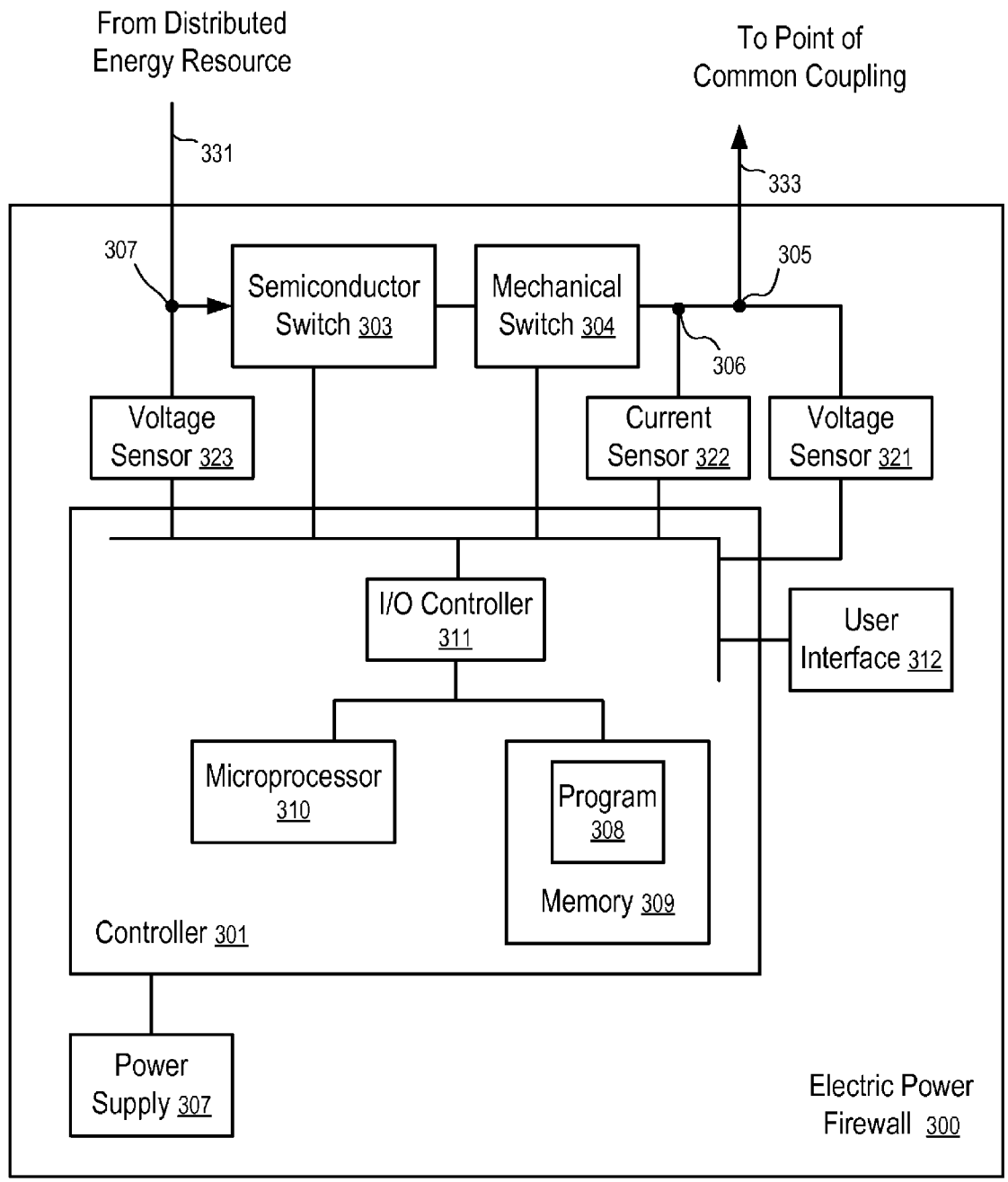
FIG. 2 shows a firewall for electric power according to one embodiment.

FIG. 2 shows a firewall for electric power according to one embodiment. In FIG. 2, the firewall 300 has a connector 331 for connection to a distributed energy resource (e.g., 205 or 207 in FIG. 1), and a connector 333 for connection to a local electric power system (e.g., 105 or 107 in FIG. 1) for further connection to a point of common coupling (PCC) (e.g., 211 or 213) in FIG. 1) of an area electric power system.

In FIG. 2, sensors 321, 322 and 323 are coupled to the sensing points 305, 306, and 307 to measure the voltages at the input and the output of the firewall 300, as well as the current at the output. At the input of the firewall 300, the voltage sensor 323 monitors the output voltage of the distributed energy source. At the output of the firewall 300, the voltage sensor 321 and the current sensor 322 monitors the output of the firewall 300.

In FIG. 2, the firewall 300 has one semiconductor switch 303 and one mechanical switch 304 (e.g., a galvanic switch), both of which switches may be used to achieve separation of the distributed energy resource from the grid.

In FIG. 2, the firewall 300 includes an internal controller 301, which has a microprocessor (e.g., CPU) 310, a memory 309 that contains a program 308 which may be one or more programs under an operating system, an input/output (I/O) controller 311.

In FIG. 2, the firewall 300 has a user interface 312, which in the case of the some implementations, may be one or more indicators and one or more push buttons. In other implementations, the user interface 312 may include a liquid crystal display and a small keyboard, or a computer interface to a PC or a network for remote monitoring and operation.

In FIG. 2, firewall 300 also contain a power supply 307, such as backup battery, in case the distributed energy resource cannot be relied upon to supply sufficient power consistently for the operations of the firewall 300.

In FIG. 2, the controller 301 uses various sensors (e.g., 321, 322, and 323) to monitor the phase, the frequency, the current, and/or the voltages at the various monitoring points (e.g., 305, 306, and 307) and to detect and decide whether the distributed energy resource connected to the input 331 is in compliance with a standard for interconnection, such as IEEE standard 1547.

Different types/kinds of distributed energy resource may have different requirements; therefore different models of firewalls may be produced for different applications. Alternatively, the firewall 300 may be field reprogrammable via a switch or a keyboard-entered code for used with different types of distributed energy resources. In some embodiments, the firewall 300 includes a communication port, through which the firewall 300 can be reprogrammable through a connection to a computer (not shown), either local or remotely accessed via a network.

In other embodiments, more or fewer sensors than those illustrated in FIG. 2 may be used. For example, the voltage sensor (321) may be not used in some embodiments. And, in some embodiments, an additional voltage sensor may be used to monitor the voltage between the semiconductor switch 303 and the mechanical switch 304.

While FIG. 2 illustrates various components of a controller 301, it is not intended to represent any particular architecture or manner of interconnecting the components. Some embodiments may use other systems that have fewer or more components than those shown in FIG. 2.

Figure 3:
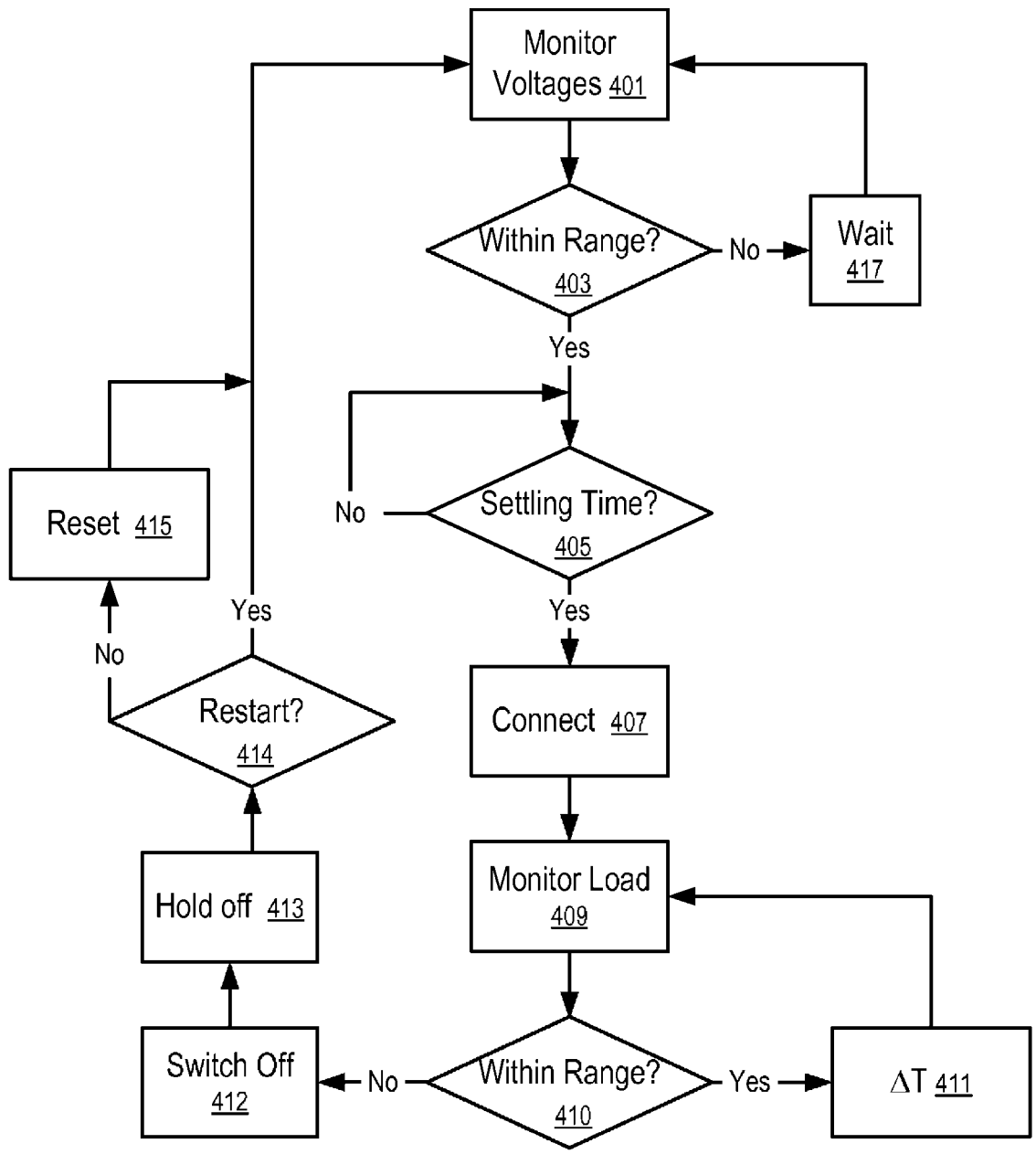
FIG. 3 shows a process implemented in the firewall according to one embodiment.

FIG. 3 shows a process implemented in the firewall according to one embodiment. In FIG. 3, before the firewall (e.g., 300 in FIG. 2) connects its input to its output (e.g., using the switches 303 and 304 in FIG. 2), the controller (e.g., 301 in FIG. 2) of the firewall monitors 401 the output voltages of the distributed energy resource (e.g., 205 or 207 in FIG. 1). The firewall determines 403 whether the monitored voltages are within a range permitted by the standard, as defined by a set of rules and constraints (e.g., stored in the memory 309 in FIG. 2).

In one embodiment, the set of rules and constraints may be written and modified for different types of distributed energy resources and different power ranges, and also to comply with the codes and standards applicable for the local area of the distributed energy resource.

If the output voltages of the distributed energy resource are not within the range permitted by the standard, the firewall and/or the distributed energy resource can enter a wait loop 417, after which the monitoring 401 starts again.

If the output voltages of the distributed energy resource and/or its frequency are within the range permitted by the standard, the firewall monitors the distributed energy resource for a period of settling time 405, which is also defined in the rules set (e.g., stored in memory 309 in FIG. 2).

During the period of settling time 405, if the voltage and/or frequency of the distributed energy resource are out of bounds, monitoring for a new period of settling time starts. If the voltage and frequency are within acceptable ranges, the firewall connects 407 the distributed energy resources to the local electric power system (e.g., by closing the switches 303 and 304 in FIG. 2).

In some embodiments, a galvanic or a semiconductor switch is used. In other embodiments, for additional safety and to reduce the risk of current leakage, both mechanical galvanic and semiconductor switches are used. The advantage of semiconductor switches is that they are much faster; however, the disadvantage is a small current leakage, which could result in dangerous voltages for people trying to work on the lines. Therefore, inclusion of either galvanic switch or a manual separator switch outside the unit is required in the codes of many areas, to safeguard personnel working on the wiring. Also, fuses are often required by many codes, at the multiple of the nominal power delivery (not shown).

Once the firewall connects the distributed energy source to the local EPS, the firewall repeatedly monitors 409 the load in a loop in operations 409, 410 and 411, at intervals based on a time factor set in operation 411.

Typically, the monitoring 409 of the load focuses on power factor aspects and phase of the load current vs. the voltage to maintain the desired angle for generation. If the unit angle is pushed too far into the generation, the risk of islanding exists, and it needs to be disconnected. However, if the unit is pushed too far in the direction of load, then the underlying risk is that it will not produce "energy fit for consumption," and thus, the energy that is not safe needs to be disconnected.

In some cases, however, a distributed energy resource may be both a load and a source, for example in the case of local battery storages. Such batteries can be charged at low night time rates, and used to deliver electricity during peak hours, for supporting air conditioning, for example, or for businesses that have a high demand during peak hours. There is a vast body of literature about how generation phase and islanding are interconnected, such as a presentation entitled "IEEE 1547 Interconnection" by Tom Basso on Jun. 9, 2004, which is incorporated herein by reference.

If the firewall determines 410 that the output is out of bounds, the firewall is switched off 412 (e.g., by setting one or both of the switches 303 and 304 to off).

After the firewall is switched off, the firewall may hold off 413 for a period, which period is also defined in the rules set (e.g., stored in the memory 309 in FIG. 2). After the hold-off period elapses, the firewall resets, in some embodiments.

In some cases, automatic restart is not allowed; and in other cases, automatic restart is allowed. If the firewall determines 414 that automatic restart is allowed, the process loops back to the operation of monitoring 401.

However, if the firewall determines 414 determines that manual reset is required, the process moves to a manual reset 415 and then loops back to the operation of monitoring 401.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs". The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An apparatus, comprising:
   a first connector configured to interface with a distributed energy source;
   a second connector configured to interface with a connection point of an electric power system;
   at least one switch coupled between the first connector and the second connector;
   at least one sensor coupled with the switch; and
   a controller coupled with the at least one switch, the controller to use the at least one switch to selectively connect or disconnect an electric path between the first connector and the second connector based on signals from the at least one sensor;
   wherein, after opening the switch in response to an output of the distributed energy source being outside a predetermined range, the controller is to hold off a period of time according to a set of rules and constraints prior to resetting.

2. The apparatus of claim 1, wherein the distributed energy source comprises an electric power generator based on at least one of: solar, wind, water, tide, wave, geothermal, gas, biofuel, pressured air and batteries.

3. The apparatus of claim 1, wherein the controller and the at least one sensor are configured to use the at least one switch to disconnect the electric path between the first connector and the second connector when the distributed energy source is not in compliance with a standard for interconnecting distributed resources with electric power systems.

4. The apparatus of claim 3, wherein the standard is in accordance with the Institute of Electrical and Electronics Engineers (IEEE) standard 1547; and the controller is re-configurable to interface with a plurality of types of distributed energy sources for compliance with the IEEE standard 1547.

5. The apparatus of claim 1, wherein the at least one sensor comprises a voltage sensor and a current sensor.

6. The apparatus of claim 5, wherein the current sensor measures a current between the first connector and the second connector.

7. The apparatus of claim 6, wherein the voltage sensor is configured to monitor an output voltage of the distributed energy source at least when the at least one switch disconnects the second connector from the first connector.

8. The apparatus of claim 1, wherein the at least one switch comprises a semiconductor switch and a mechanical switch connected in serial between the first connector and the second connector.

9. The apparatus of claim 8, wherein the mechanical switch comprises a galvanic switch.

10. The apparatus of claim 1, wherein the controller includes a microprocessor, a memory configured to store instructions for the microprocessor, and an input/output (I/O) controller to interface with the at least one sensor and the at least one switch.

11. The apparatus of claim 10, further comprising:
a user interface coupled with the microprocessor to configure operations of the microprocessor.

12. The apparatus of claim 11, wherein the operations of the microprocessor are configurable for a plurality of different requirements associated with different types of distributed energy sources.

13. A method implemented in a controller, the method comprising:
monitoring an output of a distributed energy source using the controller;
determining whether the output of the distributed energy source is in a predetermined range;
controlling at least one switch to selectively couple or decouple the output of the distributed energy source to or from an electric power system based on whether the output of the distributed energy source is within a predetermined range; and
holding off a period of time according to a set of rules and constraints prior to resetting, after opening the switch in response to the output of the distributed energy source being outside the predetermined range.

14. The method of claim 13, wherein the predetermined range is based on a standard for interconnecting distributed resources with electric power systems; and the controller is reconfigurable to monitor a plurality of different types of distributed energy sources for compliance with the standard.

15. The method of claim 13, wherein the monitoring the output comprises monitoring a phase or frequency of the output of the distributed energy source.

16. The method of claim 13, wherein the controlling the at least one switch comprises:
closing the switch to connect the distributed energy source to a point of common coupling to an area electric power system when the output of the distributed energy source is within the predetermined range; and
opening the switch to disconnect the distributed energy source from the point of common coupling to the area electric power system when the output of the distributed energy source is outside the predetermined range.

17. The method of claim 16, further comprising:
storing the set of rules and constraints in a memory of the controller to represent the predetermined range.

18. The method of claim 17, further comprising:
modifying the set of rules and constraints in the memory to adapt the controller for the distributed energy source.

19. A non-transitory machine readable medium storing instructions, the instructions causing a controller to perform a method, the method comprising:
monitoring an output of a distributed energy source using the controller;
determining whether the output of the distributed energy source is in a predetermined range;
controlling at least one switch to selectively couple or decouple the output of the distributed energy source to or from an electric power system based on whether the output of the distributed energy source is within a predetermined range; and
holding off a period of time according to a set of rules and constraints prior to resetting, after opening the switch in response to the output of the distributed energy source being outside the predetermined range.

* * * * *